(12) United States Patent
Kim et al.

(10) Patent No.: US 12,193,038 B2
(45) Date of Patent: Jan. 7, 2025

(54) METHOD AND DEVICE FOR EXECUTING MULTI-BEAM-BASED SCHEDULING REQUEST IN WIRELESS COMMUNICATION

(71) Applicant: KT CORPORATION, Gyeonggi-do (KR)

(72) Inventors: Ki-tae Kim, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/347,571

(22) PCT Filed: Oct. 27, 2017

(86) PCT No.: PCT/KR2017/012003
§ 371 (c)(1),
(2) Date: May 3, 2019

(87) PCT Pub. No.: WO2018/084500
PCT Pub. Date: May 11, 2018

(65) Prior Publication Data
US 2019/0349962 A1  Nov. 14, 2019

(30) Foreign Application Priority Data

Nov. 4, 2016 (KR) .................. 10-2016-0146955
Oct. 18, 2017 (KR) .................. 10-2017-0135215

(51) Int. Cl.
*H04W 72/50*  (2023.01)
*H04L 27/26*  (2006.01)
(Continued)

(52) U.S. Cl.
CPC ....... *H04W 72/535* (2023.01); *H04L 27/2607* (2013.01); *H04W 72/0446* (2013.01); *H04L 5/0007* (2013.01)

(58) Field of Classification Search
CPC ......... H04W 72/1257; H04W 72/0446; H04W 72/00; H04W 72/04; H04W 72/12; H04L 27/2607; H04L 5/0007; H04L 5/0053
See application file for complete search history.

(56) References Cited

U.S. PATENT DOCUMENTS 10,098,141 B2   10/2018  Park
10,172,153 B2 * 1/2019  Moon ............... H04W 72/1268
(Continued)

FOREIGN PATENT DOCUMENTS

| KR | 10-2009-0094105 A | 9/2009 |
| KR | 10-2014-0108575 A | 9/2014 |
| WO | WO2016/010227 A1 | 1/2016 |

OTHER PUBLICATIONS

LG Electronics, "Discussion on scheduling in time domain for NR", R1-1609281, 3GPP TSG RAN WG1 meeting #86bis, Lisbon, Portugal Oct. 10-14, 2016, pp. 1-3.
(Continued)

*Primary Examiner* — Nishant Divecha
(74) *Attorney, Agent, or Firm* — Insight Law Group, PLLC

(57) ABSTRACT

Provided are a method and a device for a terminal executing a scheduling request in wireless communication. The method may include: receiving, from a base station, scheduling request configuration information for configuring a scheduling request using a multi-scheduling request resource; allocating the multi-scheduling request resource according to the scheduling request configuration information; and transmitting, to the base station, a multi-scheduling request using the multi-scheduling request resource.

19 Claims, 16 Drawing Sheets

(51) Int. Cl.
*H04W 72/0446* (2023.01)
*H04L 5/00* (2006.01)

(56) References Cited

U.S. PATENT DOCUMENTS

| | | | | |
|---|---|---|---|---|
| 2010/0091755 | A1* | 4/2010 | Kwon | H04L 27/261 370/344 |
| 2010/0118828 | A1 | 5/2010 | Kwon et al. | |
| 2011/0205981 | A1* | 8/2011 | Koo | H04W 72/1284 370/329 |
| 2012/0093128 | A1* | 4/2012 | Song | H04W 36/24 370/331 |
| 2012/0213193 | A1 | 8/2012 | Kwon et al. | |
| 2013/0121260 | A1* | 5/2013 | Mukherjee | H04W 72/0466 370/329 |
| 2013/0163532 | A1 | 6/2013 | Anderson et al. | |
| 2013/0163533 | A1 | 6/2013 | Anderson et al. | |
| 2013/0163536 | A1 | 6/2013 | Anderson et al. | |
| 2013/0250828 | A1 | 9/2013 | Chou et al. | |
| 2013/0286977 | A1 | 10/2013 | Kwon et al. | |
| 2014/0004898 | A1* | 1/2014 | Yu | H04B 7/0695 455/510 |
| 2015/0373678 | A1* | 12/2015 | Chou | H04W 72/042 370/329 |
| 2015/0373737 | A1 | 12/2015 | Park | |
| 2016/0044701 | A1 | 2/2016 | Zhang et al. | |
| 2016/0242163 | A1 | 8/2016 | Kwon et al. | |
| 2017/0202009 | A1* | 7/2017 | Kim | H04W 72/1284 |
| 2017/0222779 | A1 | 8/2017 | Kwon et al. | |
| 2018/0049222 | A1* | 2/2018 | Manolakos | H04L 5/0082 |
| 2018/0110066 | A1* | 4/2018 | Luo | H04W 72/1268 |
| 2018/0199358 | A1* | 7/2018 | Moosavi | H04W 72/1268 |
| 2018/0254873 | A1 | 9/2018 | Kwon et al. | |
| 2019/0037587 | A1 | 1/2019 | Park | |
| 2019/0104538 | A1 | 4/2019 | Kim et al. | |
| 2019/0174525 | A1* | 6/2019 | Kwak | H04W 72/1268 |
| 2019/0230680 | A1* | 7/2019 | Kim | H04W 72/1231 |

OTHER PUBLICATIONS

Inter Corporation, "Scheduling request design for NR", R1-1610191, 3GPP TSG-RAN WG1 #86bis, Lisbon, Portugal, Oct. 10-14, 2016, pp. 1-5.
Inter Corporation, "NR HARQ and scheduling timing", R1-1609542, 3GPP TSG-RAN WG1 #86bis, Lisbon, Portugal Oct. 10-14, 2016, pp. 1-3.
Nokia et al., "Multi-Beam Common Control Plane Design", R1-1610247, 3GPP TSG-RAN WG1 #86bis, Lisbon, Portugal, Oct. 10-14, 2016.
European Patent Office, Extended European Search Report of corresponding EP Patent Application No. 17867332.3, May 7, 2020.
A Chinese Office Action issued on Oct. 29, 2021 in connection with Chinese Patent Application No. 201780067633.6 which corresponds to the above-referenced U.S. application.
First office action issued on Nov. 5, 2021 for the EP Application No. 17867332.3.
Second office action issued on Oct. 25, 2022 for the EP Application No. 17867332.3.
Second office action issued on Apr. 19, 2022 for the CN Application No. 201780067633.6.
Third office action issued on Jul. 20, 2022 for the CN Application No. 201780067633.6.

\* cited by examiner

METHOD AND DEVICE FOR EXECUTING MULTI-BEAM-BASED SCHEDULING REQUEST IN WIRELESS COMMUNICATION

CROSS REFERENCE TO RELATED APPLICATIONS

This application is a National Stage Patent Application of PCT International Patent Application No. PCT/KR2017/012003 (filed on Oct. 27, 2017) under 35 U.S.C. § 371, which claims priority to Korean Patent Application Nos. 10-2016-0146955 (filed on Nov. 4, 2016) and 10-2017-0135215 (filed on Oct. 18, 2017), the teachings of which are incorporated herein in their entireties by reference.

TECHNICAL FIELD

The present disclosure relates to methods and devices for performing a multi-beam-based scheduling request in a next-generation/5G radio access network (hereinafter, referred to as a new radio (NR)).

BACKGROUND ART

Recently, the 3GPP has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

In particular, an enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have a flexible frame structures, compared with the LTE/LTE-Advanced.

Meanwhile, in the NR, studies have been carried out on a multi-beam-based multiple input multiple output (MIMO) transmission technique. Also, discussions are in progress for applying the multi-beam-based MIMO transmission technique in uplink. However, specific uses of related channels have not been defined yet, resulting in corresponding scheduling request operations not having been defined.

DETAILED DESCRIPTION OF THE INVENTION

Technical Problem

In accordance with embodiments of the present disclosure, methods are provided for performing a scheduling request needed for multi-beam-based uplink operations.

Technical Solution

In accordance with an aspect of the present disclosure, a method of a base station is provided for performing a scheduling request in wireless communications. The method includes: transmitting, to a user equipment, scheduling request configuration information for configuring the scheduling request using multiple scheduling request resources, and receiving multiple scheduling requests from the user equipment using the multiple scheduling request resources based on the scheduling request configuration information.

In accordance with another aspect of the present disclosure, a method of a user equipment is provided for performing a scheduling request in wireless communications. The method includes: receiving, from a base station, scheduling request configuration information for configuring the scheduling request using multiple scheduling request resources, allocating the multiple scheduling request resources based on the scheduling request configuration information, and transmitting multiple scheduling requests to the base station using the multiple scheduling request resources.

In accordance with another aspect of the present disclosure, a user equipment is provided for performing a scheduling request in wireless communications. The user equipment includes: a receiver configured to receive, from a base station, scheduling request configuration information for configuring the scheduling request using multiple scheduling request resources, a controller configured to allocate the multiple scheduling request resources based on the scheduling request configuration information, and a transmitter configured to transmit multiple scheduling requests to the base station using the multiple scheduling request resources.

Effects of the Invention

In accordance with embodiments of the present disclosure, it is possible to perform a scheduling request needed for multi-beam-based uplink operations.

BEST MODE FOR CARRYING OUT THE INVENTION

Figure 1:
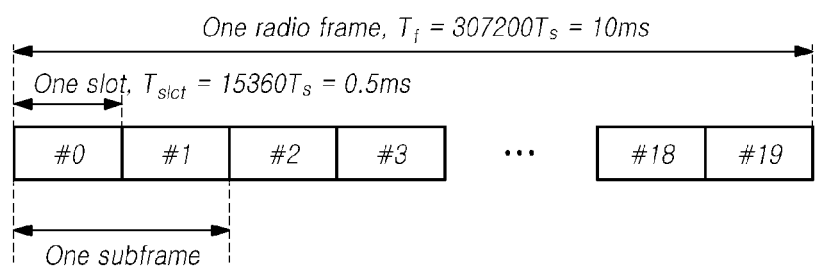
FIG. 1 is a diagram illustrating a type 1 LTE frame structure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, an machine type communication (MTC) terminal may refer to a terminal supporting low cost (or low complexity), a terminal supporting coverage enhancement, or the like. The MTC terminal may refer to a terminal supporting low cost (or low complexity), a terminal supporting coverage enhancement, and the like. The MTC terminal may refer to a terminal classified into a predetermined category for supporting low cost (or low complexity) and/or coverage enhancement.

In other words, the MTC terminal may refer to a low cost (or low complexity) user equipment category/type newly defined in 3GPP Release-13 and performing LTE-based MTC-related operations. The MTC terminal may refer to a user equipment category/type defined in or before 3GPP Release-12, which supports enhanced coverage in comparison with the typical LTE coverage or supports low power consumption. Or, the MTC device may refer to a low cost (or low complexity) user equipment category/type newly defined in Release-13.

In the present disclosure, a wireless communication system is widely deployed to provide various communication services, such as a voice communication service, a packet data service, etc. The wireless communication system includes a user equipment (UE) and a base station (BS, eNB, gNB, or xNB). In the present disclosure, the UE is defined as a generic term referring to terminals used in wireless communications. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally refers to a station communicating with the UE. The base station or cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

That is, in the present disclosure, the base station or the cell is defined as a generic term collectively including, as well as some communication service areas or functions covered by a base station controller (BSC) in CDMA, a Node-B in the WCDMA, an evolved Node-B (eNB) or a sector (site) in the LTE, and the like, all of various coverage areas, such as a megacell, a macrocell, a microcell, a picocell, a femtocell and a relay node, RRH, RU, a small cell communication range, or the like.

Each of the various cells is controlled by a base station. Therefore, the base station may be classified into two categories. The base station may be referred to 1) an apparatus that forms and provides a corresponding communication service area, such as a megacell, a macrocell, a microcell, a picocell, a femtocell, or a small cell, or 2) a communication service area. In the case of 1), the base station may be referred to i) apparatuses that form and provide area corresponding communication service area and are controlled by the same entity or ii) apparatuses that interact and cooperate with each other for forming and providing the corresponding communication service area. According to communication schemes employed by a base station, the base station may be referred to as an eNB, a remote radio head (RRH), an antenna, a radio unit (RU), a low power node (LPN), a point, a transmission/reception point, a transmission point, a reception point, or the like. In the case of 2), the base station may be a communication service area itself where UEs able to receive signals from or transmit signals to other UEs and neighboring base stations.

Accordingly, the base station is defined as a generic term collectively including the megacell, the macrocell, the microcell, the picocell, the femtocell, or the small cell, the RRH, the antenna, the RU, the LPN, the point, the eNB, the transmission/reception point, the transmission point, or the reception point.

In the present disclosure, the UE and the base station are two entities for performing transmission/reception used to embody the technology and technical spirit described in the present specification. The UE and the base station are defined as a generic term and not limited to specific terms or words. The UE and the base station are two entities for performing uplink or downlink transmission/reception used to embody the technology and technical spirit described in the present disclosure. The UE and the base station are defined as a generic term and not limited to specific terms or words. Herein, the uplink (hereinafter, referred to as "UL") refers to data transmission/reception by a UE to/from a base station, and the downlink (hereinafter, referred to as "DL") refers to data transmission/reception by a base station to/from a UE.

Any of multiple access techniques may be applied to the wireless communication system. For example, the wireless communication system may employ various multiple access techniques, such as code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like. Embodiments according to the present disclosure may be apply to resource allocation in i) asynchronous wireless communication evolving into LTE/ LTE-advanced and IMT-2020 from GSM, WCDMA, and HSPA, ii) synchronous wireless communication evolving into CDMA, CDMA-2000, and UMB. The present disclosure is not construed to be limited to or limited to a particular wireless communication field and is construed as including all technical fields to which the spirit of the present disclosure may be applied.

UL transmission and DL transmission may be performed based on i) a time division duplex (TDD) technique performing transmission through different time slots or ii) a frequency division duplex (FDD) technique performing transmission through different frequencies.

Further, in some systems, such as the LTE or LTE-advanced, a related standard specification defines an UL and a DL to be established based on a single carrier or a pair of carriers. For transmitting/receiving control information, the UL and the DL may be configured with one or more control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like. For transmitting/ receiving data, the UL and the DL may be configured with one or more data channels, such as a physical DL shared channel (PDSCH), a physical UL shared channel (PUSCH), or the like.

Meanwhile, the control information may be transmitted through the EPDCCH (enhanced PDCCH or extended PDCCH).

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

A wireless communication system to which at least one embodiment is applied may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be a BS or a macrocell (hereinafter, referred to as 'eNB') and at least one RRH that is connected to the eNB through an optical cable or an optical fiber, controlled in a wired manner, and t has high transmission power or low transmission power in a macrocell area.

Hereinafter, the DL denotes communication or a communication path from multiple transmission/reception points to a UE, or the UL denotes communication or a communication path from the UE to the multiple transmission/reception points. In the DL, a transmitter may be a part of multiple transmission/reception points and a receiver may be a part of the UE. In the UL, a transmitter may be a part of the UE, and a receiver may be a part of multiple transmission/reception points.

Hereinafter, transmission and reception of a signal through the PUCCH, the PUSCH, the PDCCH, the EPDCCH, or the PDSCH, may be described as the transmission and reception of the PUCCH, the PUSCH, the PDCCH, the EPDCCH, or the PDSCH.

In addition, a description of transmitting or receiving a PDCCH or a description of transmitting or receiving a signal through the PDCCH may be used as meaning including transmitting or receiving an EPDCCH/MPDCCH or transmitting or receiving a signal through the EPDCCH/ MPDCCH.

That is, a physical DL control channel described below may mean the PDCCH or the EPDCCH, or is also used as meaning including both the PDCCH and the EPDCCH/ MPDCCH.

Also, for convenience of description, the EPDCCH/ MPDCCH may be applied to an embodiment including the PDCCH, as an embodiment of the present disclosure. The PDCCH may be also applied to an embodiment including the EPDCCH/MPDCCH as an embodiment of the present disclosure.

Meanwhile, higher layer signaling described below includes radio resource control (RRC) signaling transmitting RRC information containing an RRC parameter.

The base station performs DL transmission to UEs. The base station may transmit a physical DL shared channel (PDSCH) which is a primary physical channel for unicast transmission, and a physical DL control channel (PDCCH) for transmitting i) DL control information such as scheduling required to receive the PDSCH and ii) scheduling approval information for transmission through an UL data channel (for example, a physical UL shared channel (PUSCH)). Hereinafter, transmitting/receiving a signal through each channel may be described in such a manner that a corresponding channel is transmitted/received.

[Typical Frame Structure]

Hereinafter, discussions are conducted based on type 1 (FDD) in the LTE frame structure. FIG. 1 is a diagram illustrating a type 1 LTE frame structure. That is, FIG. 1 shows the highest level view from 3GPP TS 36.211 for the FDD frame structure. It only shows a structure in time domain, and it does not show any structure in frequency domain.

A summary of the overall structure is as follows.

1) The time duration of one frame (or radio frame, system frame) is 10 ms. This means that 100 radio frames per second are formed within one frame.

2) The number of time samples in one frame (10 ms) is 307200 (307.200 K) samples. This means that the number of samples per second is 307200×100=30.72 M samples.

3) One radio frame is formed of 10 subframes.

4) One subframe is formed of 2 slots. This means that one radio frame is formed of 20 slots.

One slot is formed of 6 or 7 OFDM symbols. Each symbol includes a cyclic prefix (CP), and there are two types of cyclic prefix.

Figure 2:
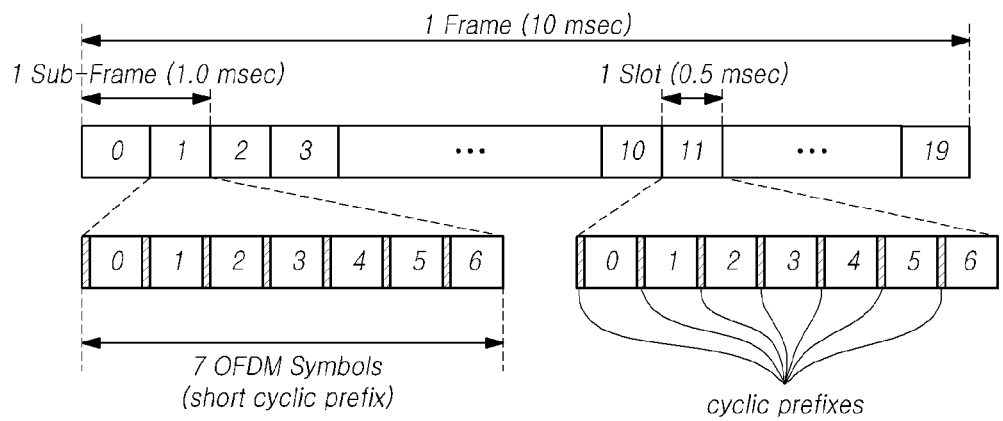
FIG. 2 is a diagram illustrating a slot and a symbol (in case of normal cyclic prefix (CP)) in the frame structure type 1.
Figure 3:
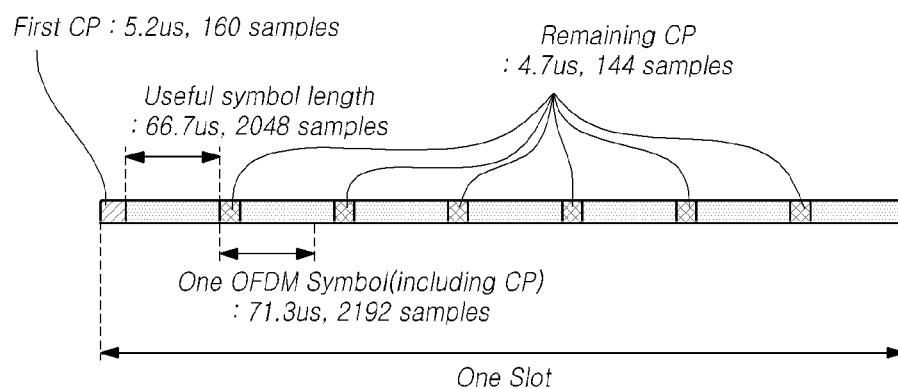
FIG. 3 is a diagram illustrating a CP length per symbol in the normal CP.

FIG. 2 is a diagram illustrating a slot and a symbol (in case of normal CP) in the type 1 frame structure. FIG. 3 is a diagram illustrating a CP length per symbol in the normal CP.

The two types of cyclic prefix are a normal CP and an extended CP longer which is than the normal CP. In case of the extended CP, one slot is formed of 6 OFDM symbols. In case of the normal CP, one slot is formed of 7 OFDM symbols. For example, as shown in FIG. 2, 7 OFDM symbols form one slot in the normal CP.

In the normal CP, the length of one CP may be different from another depending on the symbol. That is, the CP of the first OFDM symbol is longer by about 16 samples than that of the other 6 OFDM symbols, based on the number of time samples. In terms of time, the CP of the first symbol is 5.2 us equal to 160 samples, and the CP of each remaining symbol is 4.7 us 144 samples. That is, as shown in FIG. 3, 7 symbols form one slot.

Next-Generation/5G Radio Access Network (5G New Radio (NR)

Recently, the 3GPP has approved the "Study on New Radio Access Technology", which is a study item for research on next-generation/5G radio access technology. On the basis of the Study on New Radio Access Technology, discussions have been in progress for frame structures, channel coding and modulation, waveforms, multiple access schemes, and the like for the NR.

It is required to design the NR not only to provide improved data transmission rates compared with the long term evolution (LTE)/LTE-Advanced, but also to meet various requirements in detailed and specific usage scenarios. In particular, an enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have more flexible frame structures compared with the LTE/LTE-Advanced.

Specifically, the eMBB, mMTC, URLLC are considered as representative usage scenarios of the NR by the 3GPP. Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios through a frequency band provided to any NR system.

For example, likewise the typical LTE/LTE-Advanced, there is a growing need for supporting through one NR frequency band a 1 ms subframe (or a 0.5 ms slot) structure based on a 15 kHz subcarrier spacing, a 0.5 ms subframe (or a 0.25 ms slot) structure based on a 30 kHz subcarrier spacing, and a 0.25 ms subframe (or a 0.125 ms slot) structure based on a 60 kHz subcarrier spacing.

In addition, discussions are in progress for techniques of i) configuring either a subframe (e.g. X=14 or 7, or any other natural number) formed of X OFDM symbols or a symbol (e.g. Y=14 or 7, or any other natural number) formed of Y OFDM symbols as a resource allocation unit in time domain, e.g., a scheduling unit in time domain, in a numerology, e.g., a subcarrier spacing structure, or ii) defining a mini-slot formed of Z OFDM symbols (i.e. any natural number satisfying Z<Y & Z<X) having smaller granularity than the subframe or the slot.

A RB Structure in TDM-Based Mixed Numerologies

As described above, when a plurality of numerologies are supported through an NR carrier, and a subcarrier spacing for each numerology has a value of $2^n*15$ kHz (n is 0 or a natural number greater than 0), it is defined that subcarriers for each numerology are mapped on the subset/superset of those for a subcarrier spacing of 15 kHz in a nested manner in the frequency domain.

Figure 4:
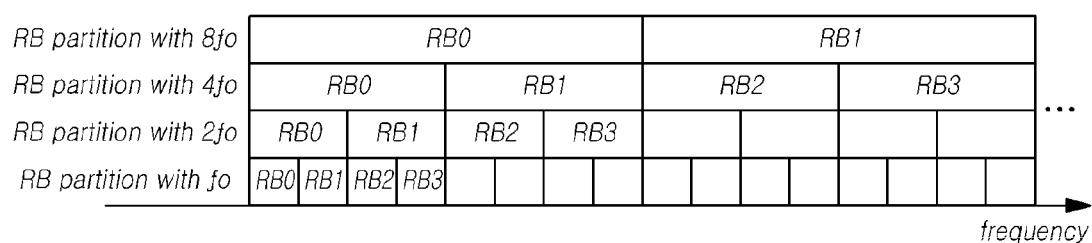
FIG. 4 is a diagram illustrating a resource block (RB) structure in a mixed numerology based on time division multiplexing (TDM).

FIG. 4 is a diagram illustrating a resource block (RB) structure in a TDM-based mixed numerology.

Figure 6:
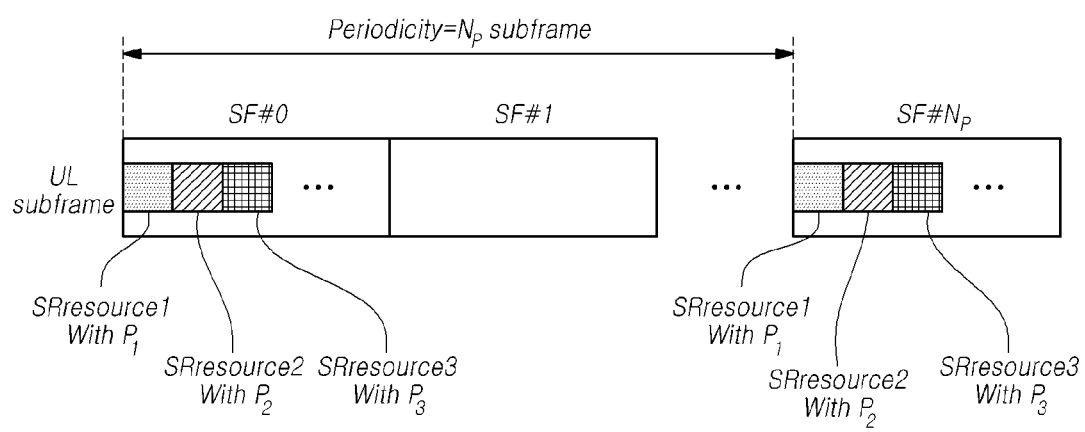
FIG. 6 is a diagram illustrating an example of transmitting sequential multiple scheduling requests (transmission in the first half of a specific subframe) according to Embodiment 1 of the present disclosure.

In addition, in case a frame structure is configured by multiplexing corresponding numerologies based on the TDM, resource blocks (RB) used as a resource allocation unit in the frequency axis through a corresponding NR carrier are defined as the subset/superset of the RB for a 15 kHz-based RB grid in a nested manner, as shown FIG. 6.

In this case, the number of subcarriers forming one RB in each numerology is determined to have a specific number, for example, one of 12 or 16 regardless of a corresponding numerology.

Meanwhile, in the NR, studies have been carried out on a multi-beam-based multiple input multiple output (MIMO) transmission technique. Also, discussions are in progress for applying the multi-beam-based MIMO transmission technique in uplink. However, specific uses of related channels have not been defined yet, resulting in corresponding scheduling request operations not having been defined.

In accordance with embodiments of the present disclosure, resource allocation and a method therefor are provided for performing a multi-beam-based scheduling request in UL operations of the NR. It is noted that methods of transmitting or receiving a scheduling request used in the typical LTE are applied for a method of transmitting or receiving a scheduling request not specifically described in the embodiments of the present disclosure, and a method of transmitting a scheduling request used in the LTE is included in a part of present disclosure.

In accordance with embodiments of the present disclosure, methods are provided for performing a scheduling request needed for multi-beam-based UL operations.

Embodiment 1. Performing a Multi-Beam-Based Scheduling Request

Basically, a non-precoding based scheduling request based on an omni-beam is operated in the LTE. Accordingly, in a state where a certain resource of a PUCCH is configured for the scheduling request, a base station recognizes whether the resource is on/off and performs the scheduling request.

However, in the NR, discussions on UL MIMO are in progress for supporting various frequency bands including a high frequency band. Therefore, this Embodiment 1 provides operations for a multi-beam-based scheduling request.

Since a multi-beam (hereinafter, the term "multi-beam" referred to as an array/set/group of multiple beams or multiple beams) is more directional than an omni-beam, the reception performance of a signal obtained by the multi-beam is improved due to beam gain in a certain direction. However, in case the multi-beam goes beyond a certain range, one or more of the beams enters an edge of the multi-beam. Therefore it is not possible to obtain a beam forming effect. Since a change range of direction of a UE is normally larger than that of a base station. Therefore, in the Embodiment 1, a procedure is provided for selecting a certain number of beam forming candidates and simultaneously requesting scheduling requests over the corresponding beams. Thus, the UE may perform a more stable scheduling request operation.

For example, the following multiple scheduling request resource allocation may be performed using scheduling request configuration information on a typical scheduling request configuration, such as an RRC message. The following RRC message configuration (e.g., scheduling request configuration information) shows an example of a message configuration for three multi-beam based scheduling request transmissions.

Example: SchedulingRequestConfig Information Element

```
-- ASN1START
SchedulingRequestConfig ::=    CHOICE {
    release                    NULL,
    setup                      SEQUENCE (
        sr-PUCCH-ResourceIndex1    INTEGER (0..2047),
        sr-ConfigIndex1            INTEGER (0..157),
        dar-TransMax1              ENUMERATED (
                                      n4, n8, n16, n32, n64, spare3, spare2, spare1)
        sr-PUCCH-ResourceIndex2    INTEGER (0..2047),
        sr-ConfigIndex2            INTEGER (0..157),
        dsr-TransMax2              ENUMERATED (
                                      n4, n8, n16, n32, n64, spare3, spare2, spare1)
    sr-PUCCH-ResourceIndex3        INTEGER (0..2047),
        sr-ConfigIndex3            INTEGER (0..157),
        dsr-TransMax3              ENUMERATED {
                                      n4, n8, n16, n32, n64, spare3, spare2, spare1)
    }
}
SchedulingRequestConfig-v1020 ::=    SEQUENCE {
    sr-PUCCH-ResourceIndexP1-r10     INTEGER (0..2047)      OPTIONAL       -- Need OR
}
-- ASN1STOP
```

TABLE 1

SchedulingRequestConfig field descriptions dsr-TransMax
Parameter for SR transmission in TS 36.321 [6, 5.4.4]. The value n4 corresponds to 4 transmissions, n8 corresponds to 8 transmissions and so on. EUTRAN configures the same value for all serving cells for which this field is configured.
sr-ConfigIndex
Parameter $I_{SR}$. See TS 36.213 [23, 10.1]. The values 156 and 157 are not applicable for Release 8.
sr-PUCCH-ResourceIndex, sr-PUCCH-ResourceIndexP1
Parameter: $n_{PUCCH,SRI}^{(1,p)}$ for antenna port P0 and for antenna port P1 respectively, see TS 36.213 [23, 10.1].
E-UTRAN configures sr-PUCCH-ResourceIndexP1 only if sr-PUCCHResourceIndex is configured.

As shown in Table 1, the ds-TransMax is a parameter for SR transmission in 3GPP TS 36.321 [6, 5.5.4]. For example, the value n4 corresponds to a total of 4 transmissions, and n8 corresponds to a total of 8 transmissions. A wireless network (e.g., EUTRAN or next generation wireless network) sets an identical value for all the serving cells configured therein in this field.

The sr-ConfigIndex means the parameter ISR (see 3GPP TS 36.213 [234,10.1]).

The sr-PUCCH-ResourceIndex and the sr-PUCCH-ResourceIndexP1 denotes $n_{PUCCH,SRI}^{(1,p)}$ for antenna ports P0 and P1 respectively (see 3GPP TS 36.213[234,10.1]). The wireless network (e.g., EUTRAN or next generation wireless network) sets the sr-PUCCH-ResourceIndex only when the sr-PUCCH-ResourceIndexP1 is set.

Here, it is basically possible for the UE to operate taking into account an UL tx beam candidate obtained by the UE. In case UL beam candidates of the UE which may be selected by the UE or indicated by a base station is 'N', 'N' scheduling request resources are also mapped to corresponding beams on one-to-one basis. The above case corresponds to the case where N=3.

Through this, the base station may stably detect a scheduling request signal transmitted from the UE, enable fast UL data resource allocation and transmission, and simultaneously perform UL beam refinement of the UE when receiving the scheduling request signal.

Figure 5:
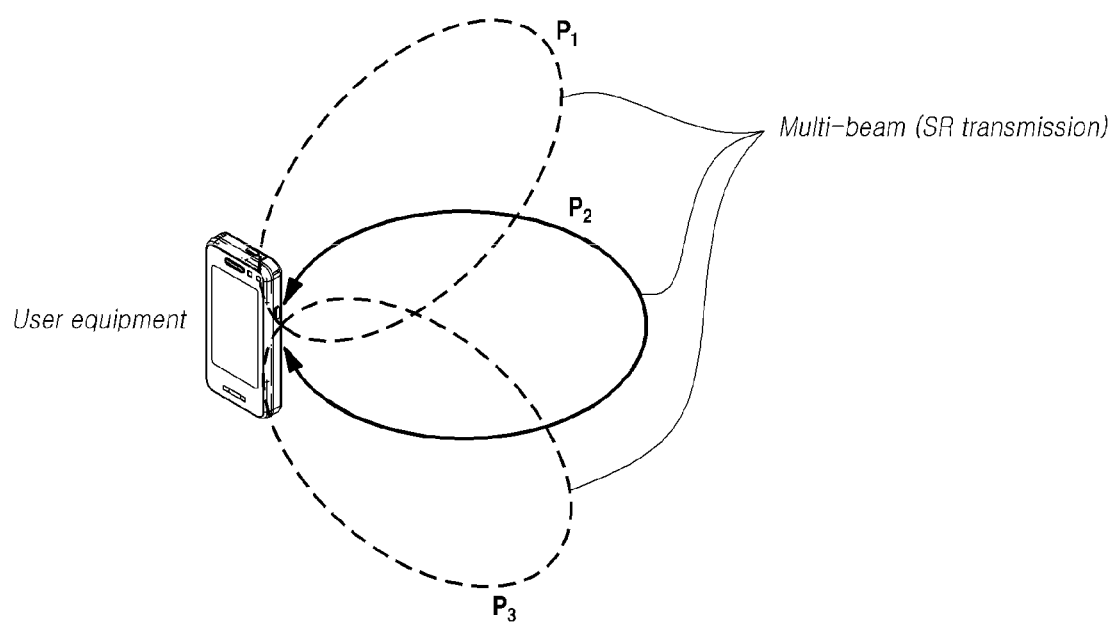
FIG. 5 is a diagram illustrating a method of transmitting a multi-beam-based scheduling request according to Embodiment 1 of the present disclosure.

FIG. 5 is a diagram illustrating a method of transmitting a multi-beam-based scheduling request according to Embodiment 1 of the present disclosure.

As shown in FIG. 5, upward beams of the UE may be a multi-beam, such as, $P_1$, $P_2$, and $P_3$ (herein, P may denote an upward beamforming precoder or an upward beam index)

For example, when the upward beams of the UE are $P_1$, $P_2$, and $P_3$, 3 scheduling request resources are also individually allocated. Therefore, mapping such as {$P_1$,SRresoucrce1}, {$P_2$,SRresoucrce2}, {$P_3$,SRresoucrce3} is performed. In addition, a method of allocating scheduling requests to various resources may be utilized for simple repetitive transmission and reception accuracy for a specific beam.

The scheduling request resource(s) includes a physical resource or a logical resource used for a scheduling request, such as a time resource, a frequency resource, and a code resource.

Embodiment 1-1. Allocating 'N' Multi-Beams to 'N' Scheduling Request Resources for a Scheduling Request and Sequentially Transmitting Them This Embodiment 1-1, as described above, is directed to a method for allocating 'N' scheduling request resources to 'N' upward beams.

Here, in order to transmit a scheduling request specifically, scheduling requests are sequentially transmitted in time domain. At this time, 'N' scheduling request resources may be allocated, each of which is different from another.

The multiple 'N' scheduling request resources may be transmitted sequentially in the time domain, or may be transmitted based on a unit of a pre-configured time. The pre-configured time unit may be one of a radio frame, a slot, a mini-slot, a sub-slot, a subframe, or a symbol, or may be a combination of two or more thereof.

Figure 7:
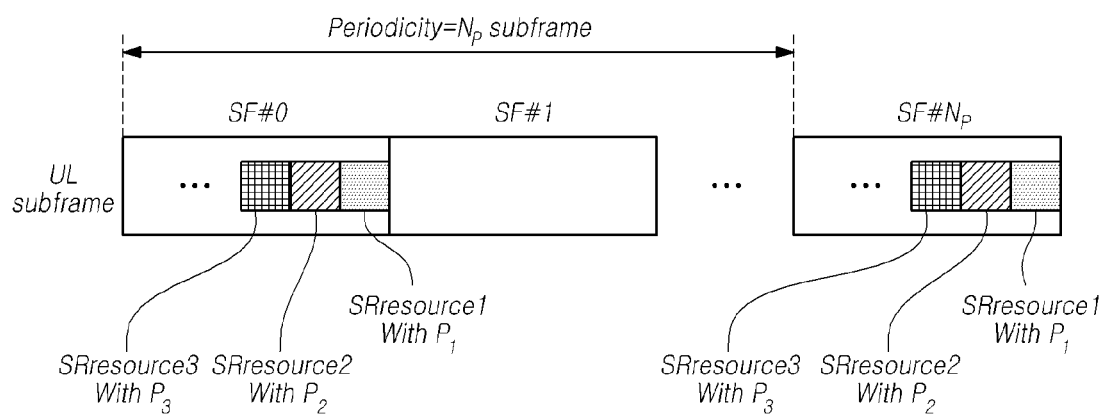
FIG. 7 is a diagram illustrating an example of transmitting sequential multiple scheduling requests (transmission in the other half of a specific subframe) according to Embodiment 1-1 of the present disclosure.
Figure 8:
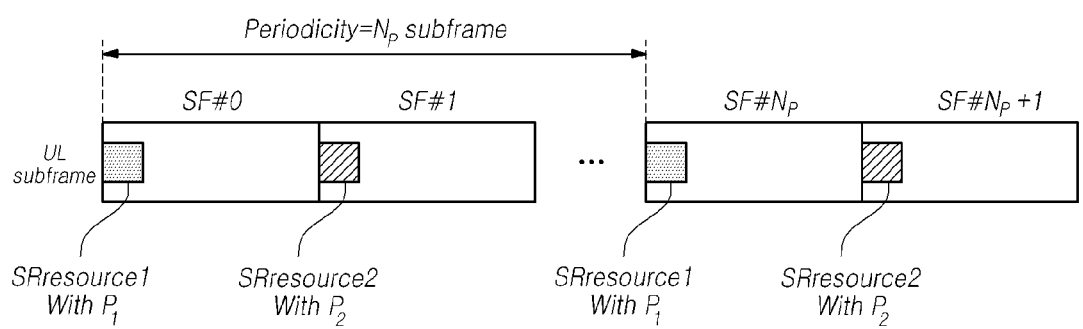
FIG. 8 is a diagram illustrating an example of transmitting sequential multiple scheduling requests (consecutive subframe distribution transmission in the other half of a specific subframe) according to the Embodiment 1-1 of the present disclosure.

FIG. 6 is a diagram illustrating an example of transmitting sequential multiple scheduling requests (transmission in the first half of a specific subframe) according to Embodiment 1-1 of the present disclosure. FIG. 7 is a diagram illustrating another example of transmitting sequential multiple scheduling requests (transmission in the other half of a specific subframe) according to Embodiment 1-1 of the present disclosure. FIG. 8 is a diagram illustrating still another example of transmitting sequential multiple scheduling requests (consecutive subframe distribution transmission in the other half of a specific subframe) according to the Embodiment 1-1 of the present disclosure.

First, as shown in FIGS. 6 and 7, all N scheduling request signals may be transmitted in a specific UL radio frame, and retransmission may be performed with the time duration of $N_P$ subframe. In addition, a transmission position in the subframe may also be arranged in the first half or the second half of the subframe.

In addition, the number of transmissions of the typical scheduling request is also specified in an RRC message. When the value of dsr-TransMax is set to n4, scheduling requests are transmitted 4 times in total. Such a principle may be similarly applied to the Embodiment 1-1, therefore, it is possible to set the number of transmissions of a scheduling request in this embodiment.

Additionally, as shown in FIG. 8, it is also possible to transmit scheduling request signals consecutively by distributing the scheduling request signals into consecutive subframes other than a specific subframe. Here, a unit of the UL time for transmitting the scheduling request signals may be basically a radio frame and may be substituted by a unit of a slot/mini-slot/sub-slot or the like.

Embodiment 1-2. Allocating 'N' Multi-Beams to 'N' Scheduling Request Resources for a Scheduling Request and Simultaneously Transmitting Them The Embodiment 1-2, unlike the Embodiment 1-1, is directed to a method for simultaneously transmitting multiple scheduling request signals at a specific time.

Here, in order to transmit scheduling requests specifically, scheduling requests may be transmitted through resources that are independently allocated, or may be transmitted by being multiplexed to specific resources, similar to the typical PUCCH.

That is, in the Embodiment 1-2, multiple 'N' scheduling request resources are transmitted using different frequency resources from one another or an identical frequency resource at an identical time.

Figure 9:
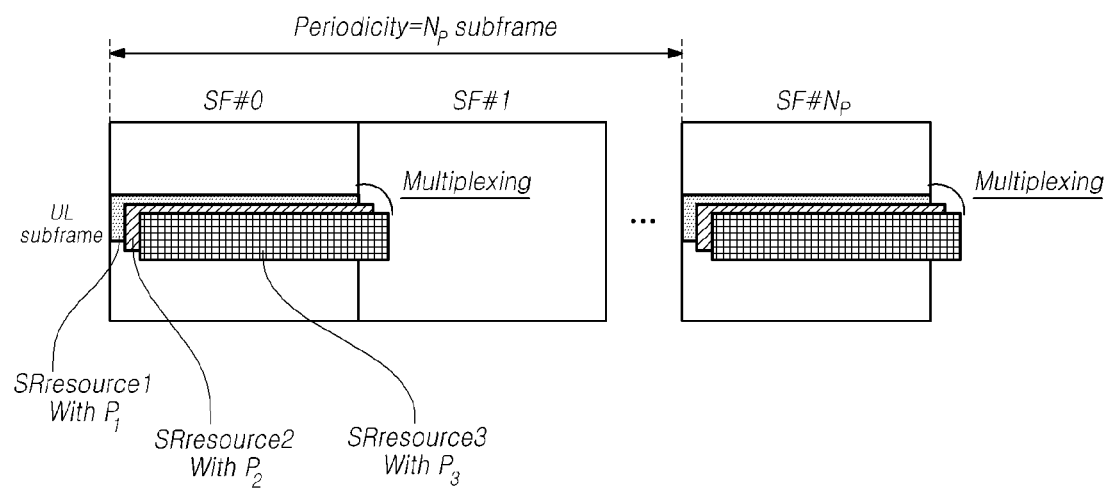
FIG. 9 is a diagram illustrating an example of transmitting multiple scheduling requests using identical frequency-time resources according to Embodiment 1-2 of the present disclosure.
Figure 10:
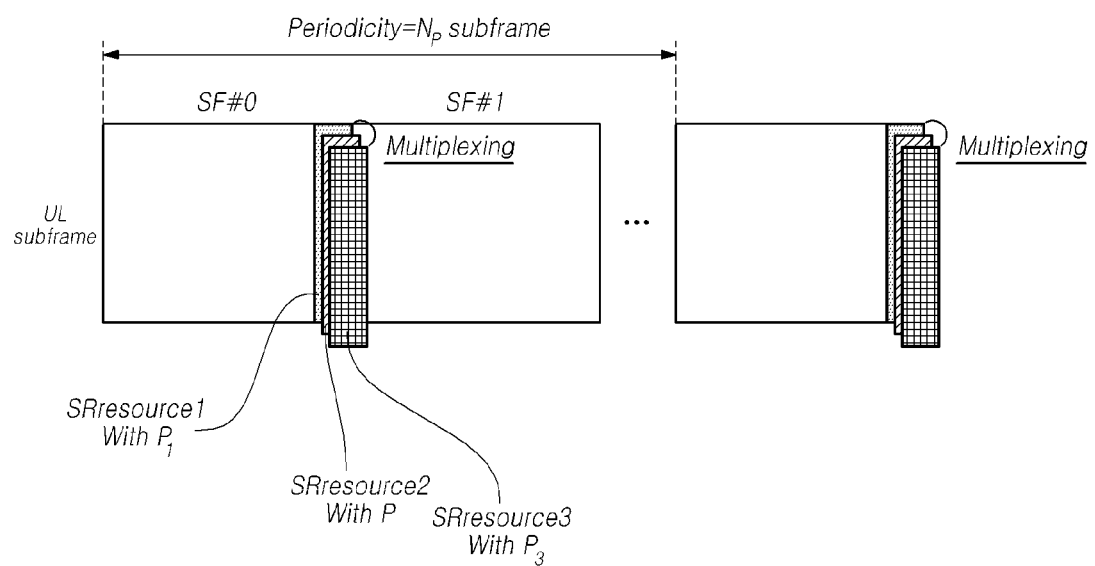
FIG. 10 is a diagram illustrating another example of transmitting multiple scheduling requests using identical frequency-time resources according to the Embodiment 1-2 of the present disclosure.
Figure 11:
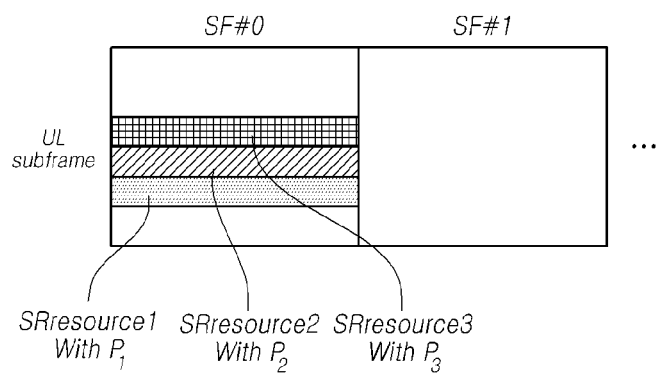
FIG. 11 is a diagram illustrating further another example of transmitting multiple scheduling requests using identical frequency-time resources according to the Embodiment 1-2 of the present disclosure.

FIG. 9 is a diagram illustrating further another example of transmitting multiple scheduling requests using identical frequency-time resources according to the Embodiment 1-2 of the present disclosure. FIG. 10 is a diagram illustrating still another example of transmitting multiple scheduling requests using identical frequency-time resources according to the Embodiment 1-2 of the present disclosure. FIG. 11 is a diagram illustrating yet another example of transmitting multiple scheduling requests using identical frequency-time resources according to the Embodiment 1-2 of the present disclosure.

As shown in FIGS. 9 and 10, the scheduling request signals may be multiplexed into frequency-time resources and transmitted to a base station. At this time, the scheduling request resources may be restricted to a specific symbol position or a specific frequency band.

When the scheduling request resources are transmitted without being multiplexed, as shown in FIG. 11, transmissions are performed at an identical time using independent frequency resources using the FDM structure.

Here, a unit of the UL time for transmitting the scheduling request signals may be basically a radio frame and may be substituted by a unit of a slot/mini-slot/sub-slot or the like.

Embodiment 2. Performing a Sector-Beam-Based Scheduling Request

The Embodiment 2 is directed to a method for transmitting a scheduling request signal of a UE using a broad-beam rather than a narrow beam (a sharp beam or a fine beam) to a base station. Here, the following beam forming technique may be applied basically.

Beam broadening
Beam synthesis
Sector beam

That is, a UE performs scheduling request transmission using a broad beam in the form of a sector beam without transmitting a final narrow beam. The broad beam may include upstream candidate beams of the UE. One or more scheduling request signals may be transmitted using a single sector beam on a single scheduling request resource.

That is, according to the Embodiment 2, the scheduling request may reuse the typical single scheduling request resource allocation procedure. In this case, it is preferable that a sector beam used for transmitting the scheduling request has a form of a beam including a final beam as follows. That is, a UE generates a sector beam including a best-beam of the UE and transmits a scheduling request using the generated beam. At this time, it is possible to perform repetitive transmission by 'Nx' for insufficient beam gain.

Figure 12:
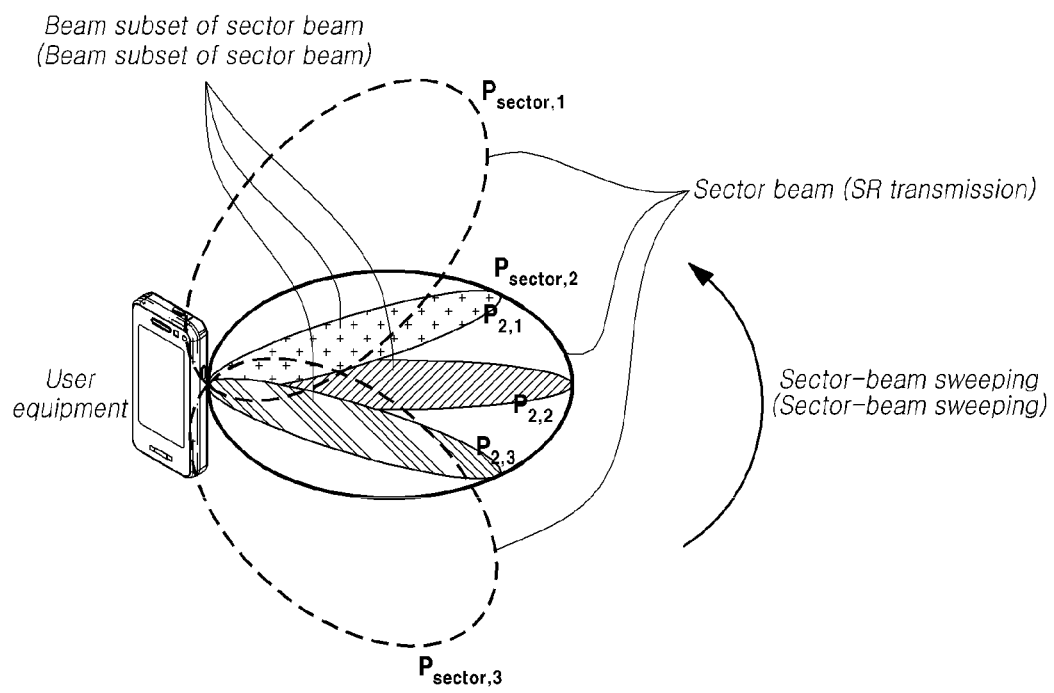
FIG. 12 is a diagram illustrating a method of transmitting a sector-beam-based scheduling request according to Embodiment 2 of the present disclosure.

FIG. 12 is a diagram illustrating a method of transmitting a sector-beam-based scheduling request according to Embodiment 2 of the present disclosure.

Referring to FIG. 12, basically, one or more scheduling requests are transmitted in a specific range or all directions formed by sweeping or rotating in a specific direction with specific directivity in the form of a group-wise beam or sector beam.

As shown in FIG. 12, three sector beams (Psector, 1, Psector, 2, Psector, 3) for transmitting scheduling request signals are used, and each sector beam includes a specific number of beam subsets as shown in Table 2.

For example, in Table 2 defining a sector beam for transmitting scheduling request signals, when the best beam of a UE is $P_{1,3}$, the UE transmits scheduling requests using a sector beam $P_{sector,1}$ including its best beam $P_{1,3}$.

TABLE 2

| Sector beam | Beam subset |
|---|---|
| $P_{sector, 1}$ | $P_{1, 1}$ |
| | $P_{1, 2}$ |
| | $P_{1, 3}$ |

TABLE 2-continued

| Sector beam | Beam subset |
|---|---|
| | $P_{1,4}$ |
| | ... |
| $P_{sector, 2}$ | $P_{2,1}$ |
| | $P_{2,2}$ |
| | $P_{2,3}$ |
| | $P_{2,4}$ |
| | ... |
| ... | ... |

As described above, in the NR, methods and UE's operation have been provided for performing the multi-beam-based scheduling request procedure in accordance with Embodiments 1, 1-1, 1-2 and 2 of the present disclosure. Hereinafter, methods of a base station for performing a scheduling request between the base station and a UE in wireless communications in accordance with Embodiments 1, 1-1, 1-2 and 2 of the present disclosure will be described.

Figure 13:
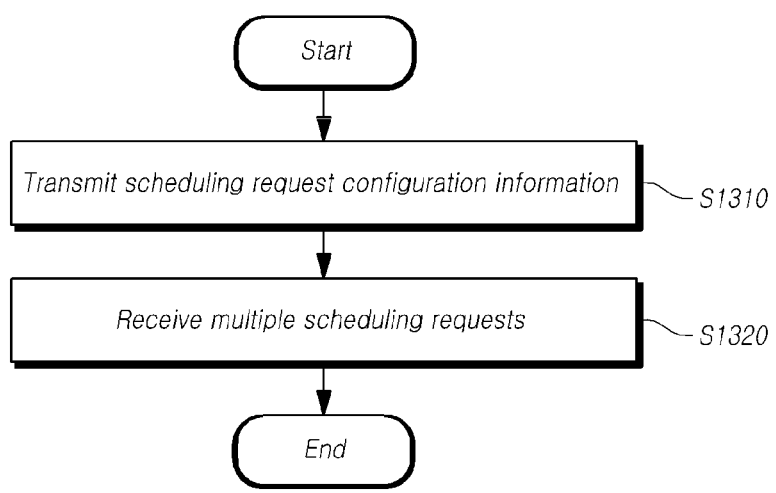
FIG. 13 is a flow chart illustrating a method of a base station for performing a scheduling request in wireless communications according to another embodiment of the present disclosure.

FIG. 13 is a flow chart illustrating a method of a base station for performing a scheduling request in wireless communications according to an embodiment of the present disclosure.

Referring to FIG. 13, the method 1300 of the base station for performing the scheduling request in wireless communications includes transmitting, to a UE, scheduling request configuration information for configuring the scheduling request using multiple scheduling request resources at step S1310, and receiving multiple scheduling requests from the UE using the multiple scheduling request resources based on the scheduling request configuration information at step S1320.

In the step S1310, the base station may allocate the scheduling request resources to the UE by transmitting scheduling request configuration information on the typical scheduling request configuration using an RRC message. As described above, the configuration of the RRC message, such as, a scheduling request configuration information element, may include a first field (ds-TransMax) indicating the total number of transmissions for transmitting a scheduling request, a second field (sr-ConfigIndex) indicating a scheduling request configuration index, a third field (sr-PUCCH-ResourceIndex, sr-PUCCH-ResourceIndexP1) indicating a PUCCH resource index for transmitting the scheduling request of each antenna port, or the like, as shown in Table 1.

As described above, when UL beam candidates selected by the UE or indicated by the base station is 'N', 'N' scheduling request resources are also mapped to corresponding beams on one-to-one basis. As described in the Embodiment 1, when the upward beams of the UE are $P_1$, $P_2$, and $P_3$, 3 scheduling request resources are also individually allocated and therefore, mapping such as $\{P_1, SRresource1\}$, $\{P_2, SRresource2\}$, $\{P_3, SRresource3\}$ is performed.

The scheduling request resource(s) includes a physical resource or a logical resource used for a scheduling request, such as a time resource, a frequency resource, and a code resource.

The multiple scheduling request resources may be consecutive time resources or resources based on a unit of a pre-configured time in time domain.

In the step S1320, the multiple scheduling requests may be received from the UE consecutively or based on a unit of a pre-configured time, in the time domain.

As described in the Embodiment 1-1, the scheduling request resources are distinguished from one another in the time domain and allocated with 'N' resources. The base station may receive sequentially scheduling request resources in the time domain. The multiple 'N' scheduling request resources may be received sequentially in the time domain, or may be received based on a unit of a pre-configured time.

The pre-configured time unit may be one of a radio frame, a slot, a mini-slot, a sub-slot, a subframe, or a symbol, or may be a combination of two or more thereof.

As shown in FIGS. 6 and 7, all N scheduling request signals may be received in a specific UL radio frame, and re-reception may be performed with the time duration of $N_P$ subframe. In addition, a transmission position in the subframe may also be arranged in the first half or the second half of the subframe.

Additionally, as shown in FIG. 8, it is also possible to receive scheduling request signals consecutively by distributing the scheduling request signals into consecutive subframes other than a specific subframe. Here, a unit of the UL time for transmitting the scheduling request signals may be basically a radio frame and may be substituted by a unit of a slot/mini-slot/sub-slot or the like.

Meanwhile, the multiple scheduling request resources may be frequency resources identical to or different from one another over an identical time resource. In step S1320, the multiple scheduling requests may be received from the UE over frequencies identical to or different from one another in an identical time.

In addition, the multiple scheduling requests may be multiplexed in an identical time and then received from the UE. For example, the multiple scheduling requests may be received from the UE over independent frequencies by frequency multiplexing modulation in an identical time.

As described in the Embodiment 1-2, the multiple 'N' scheduling requests may be received from the UE through frequency resources identical to or different from one another in an identical time.

As shown in FIGS. 9 and 10, the scheduling request signals may be multiplexed into frequency-time resources and then received by the base station. At this time, the scheduling request resources may be restricted to a specific symbol position or a specific frequency band.

When the scheduling request resources are transmitted without being multiplexed, as shown in FIG. 11, transmissions are performed at an identical time using independent frequency resources using the FDM structure.

Here, a unit of the UL time for transmitting the scheduling request signals may be basically a radio frame and may be substituted by a unit of a slot/mini-slot/sub-slot or the like.

As described in the Embodiment 2, the UE performs scheduling request transmission using a broad beam in the form of a sector beam without transmitting a final narrow beam. The broad beam may include upstream candidate beams of the UE. One or more scheduling request signals may be received using a single sector beam on a single scheduling request resource.

As described above, the scheduling request may reuse the typical single scheduling request resource allocation procedure. In this case, it is preferable that a sector beam used for transmitting the scheduling request has a form of a beam including a final beam, as shown in FIG. 12. That is, the UE generates a sector beam including a best-beam of the UE and transmits a scheduling request using the generated beam. At this time, it is possible to perform repetitive transmission by 'Nx' for insufficient beam gain.

Figure 14:
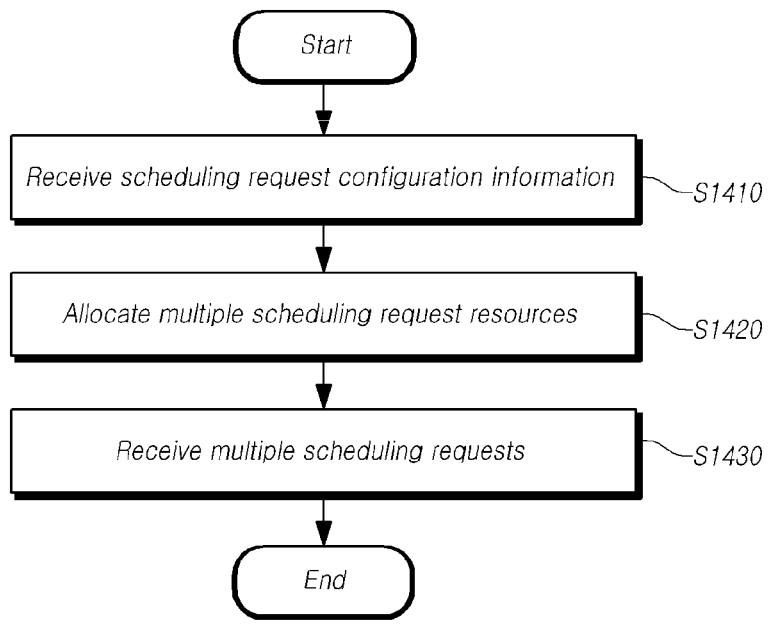
FIG. 14 is a flow chart illustrating a method of a user equipment for performing a scheduling request in wireless communications according to another embodiment of the present disclosure.

FIG. 14 is a flowchart illustrating a method of a UE for performing a scheduling request in wireless communications according to an embodiment of the present disclosure.

Referring to FIG. 14, the method 1400 of the UE for performing the scheduling request in wireless communications includes receiving, from a base station, scheduling request configuration information for configuring the scheduling request using multiple scheduling request resources at step S1410, and allocating the multiple scheduling request resources based on the scheduling request configuration information at step S1415, and transmitting multiple scheduling requests to the base station using the multiple scheduling request resources at step S1420.

In the step S1410, the UE may receive scheduling request configuration information on the typical scheduling request configuration, such as an RRC message.

In the step S1415, the UE may allocate multiple scheduling request resources based on the scheduling request configuration information.

As described above, the configuration of the RRC message, such as, a scheduling request configuration information element, may include a first field (ds-TransMax), a second field (sr-ConfigIndex), a third field (sr-PUCCH-ResourceIndex, sr-PUCCH-ResourceIndexP1), or the like, as shown in Table 1.

As described above, in case UL beam candidates of the UE which may be selected by the UE or indicated by the base station is 'N', 'N' scheduling request resources are also mapped to corresponding beams on one-to-one basis. As described in the Embodiment 1, when the upward beams of the UE are $P_1$, $P_2$, and $P_3$, 3 scheduling request resources are also individually allocated and therefore, mapping such as $\{P_1,SRresource1\}$, $\{P_2,SRresource2\}$, $\{P_3,SRresource3\}$ is performed.

As described above, the scheduling request resource(s) includes a physical resource or a logical resource used for a scheduling request, such as a time resource, a frequency resource, and a code resource.

As described above, the multiple scheduling request resources may be consecutive time resources or resources based on a unit of a pre-configured time, in time domain. In the step S1420, the multiple scheduling requests may be transmitted to the base station consecutively or based on a unit of a pre-configured time, in the time domain.

As described in the Embodiment 1-1, the scheduling request resources are distinguished from one another in the time domain and allocated with 'N' resources. The UE may transmit sequentially scheduling request resources in the time domain. The multiple 'N' scheduling request resources may be transmitted sequentially in the time domain, or may be transmitted based on a unit of a pre-configured time.

As described above, the pre-configured time unit may be one of a radio frame, a slot, a mini-slot, a sub-slot, a subframe, or a symbol, or may be a combination of two or more thereof.

As shown in FIGS. 6 and 7, all N scheduling request signals may be received in a specific UL radio frame, and re-transmission may be performed with the time duration of $N_P$ subframe. In addition, a transmission position in the subframe may also be arranged in the first half or the second half of the subframe.

Additionally, as shown in FIG. 8, it is also possible to transmit scheduling request signals consecutively by distributing the scheduling request signals into consecutive subframes other than a specific subframe. Here, a unit of the UL time for transmitting the scheduling request signals may be basically a radio frame and may be substituted by a unit of a slot/mini-slot/sub-slot or the like.

As described above, the multiple scheduling request resources may be frequency resources identical to or different from one another over an identical time resource. In the step S1420, the multiple scheduling requests may be transmitted to the base station over frequencies identical to or different from one another in an identical time.

Meanwhile, the multiple scheduling requests may be multiplexed in an identical time and transmitted to the base station. For example, the multiple scheduling requests may be transmitted to the base station over independent frequencies by frequency multiplexing modulation in an identical time.

As described in the Embodiment 1-2, the multiple 'N' scheduling requests may be transmitted to the base station through frequency resources identical to or different from one another in an identical time.

As shown in FIGS. 9 and 10, the scheduling request signals may be multiplexed into frequency-time resources and transmitted to the base station. At this time, the scheduling request resources may be restricted to a specific symbol position or a specific frequency band.

When the scheduling request resources are transmitted without being multiplexed, as shown in FIG. 11, transmissions are performed at an identical time using independent frequency resources using the FDM structure.

Here, a unit of the UL time for transmitting the scheduling request signals may be basically a radio frame and may be substituted by a unit of a slot/mini-slot/sub-slot or the like.

As described in the Embodiment 2, the UE performs scheduling request transmission using a broad beam in the form of a sector beam without transmitting a final narrow beam. The broad beam may include upstream candidate beams of the UE. One or more scheduling request signals may be transmitted using a single sector beam on a single scheduling request resource.

As described above, the scheduling request may reuse the typical single scheduling request resource allocation procedure. In this case, it is preferable that a sector beam used for transmitting the scheduling request has a form of a beam including a final beam, as shown in FIG. 12. That is, the UE generates a sector beam including a best-beam of the UE and transmits a scheduling request using the generated beam. At this time, it is possible to perform repetitive transmission by 'Nx' for insufficient beam gain.

Figure 15:
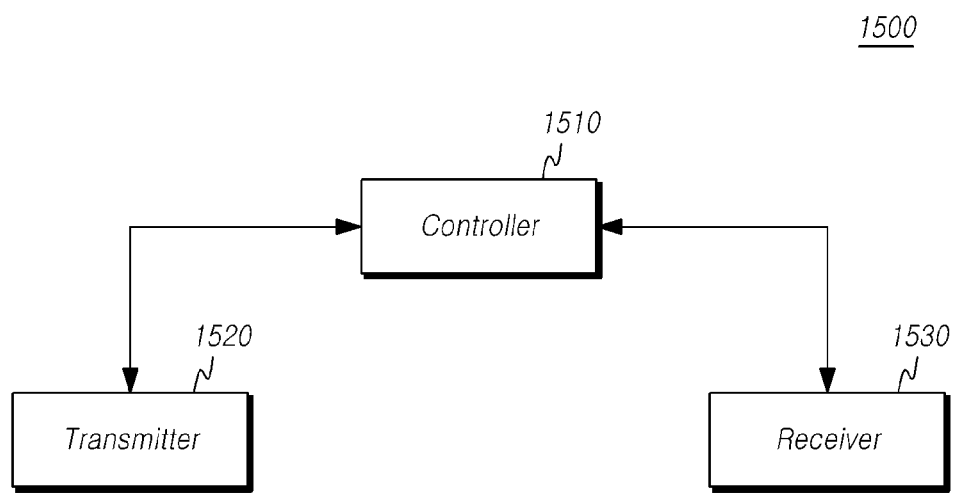
FIG. 15 is a block diagram illustrating a base station according to another embodiment of the present disclosure.

FIG. 15 is a block diagram illustrating a base station according to an embodiment of the present disclosure.

Referring to FIG. 15, a base station 1500 according to an embodiment includes a controller 1510, a transmitter 1520, and a receiver 1530.

The controller 1510 may include at least one processor and may be configured to control the operation of the base station 1500 for performing a multi-beam-based scheduling request in a next-generation wireless communications, according to embodiments of the present disclosure.

The transmitter 1520 and the receiver 1530 respectively are configured to transmit and receive signals, messages, and data necessary for carrying out some embodiments as described above, to and from a UE.

Referring to FIG. 15, the base station 1500 for performing the scheduling request in wireless communications includes a transmitter configured to transmit, to a UE, scheduling request configuration information for configuring the scheduling request using multiple scheduling request resources, and a receiver configured to receive multiple scheduling requests from the UE using the multiple scheduling request resources based on the scheduling request configuration information.

As described above, the multiple scheduling request resources may be consecutive time resources or resources based on a unit of a pre-configured time, in time domain.

The receiver 1530 may be configured to receive the multiple scheduling requests from the UE consecutively or based on a unit of a pre-configured time, in the time domain.

The pre-configured time unit may be one of a radio frame, a slot, a mini-slot, a sub-slot, a subframe, or a symbol, or may be a combination of two or more thereof.

Meanwhile, the multiple scheduling request resources may be frequency resources identical to or different from one another over an identical time resource. The receiver 1530 may be configured to receive the multiple scheduling requests from the UE over frequencies identical to or different from one another in an identical time.

In addition, the receiver 1530 may be configured to receive, from the UE, the multiple scheduling requests being multiplexed in an identical time. For example, the multiple scheduling requests may be received from the UE over independent frequencies by frequency multiplexing modulation in an identical time.

Figure 16:
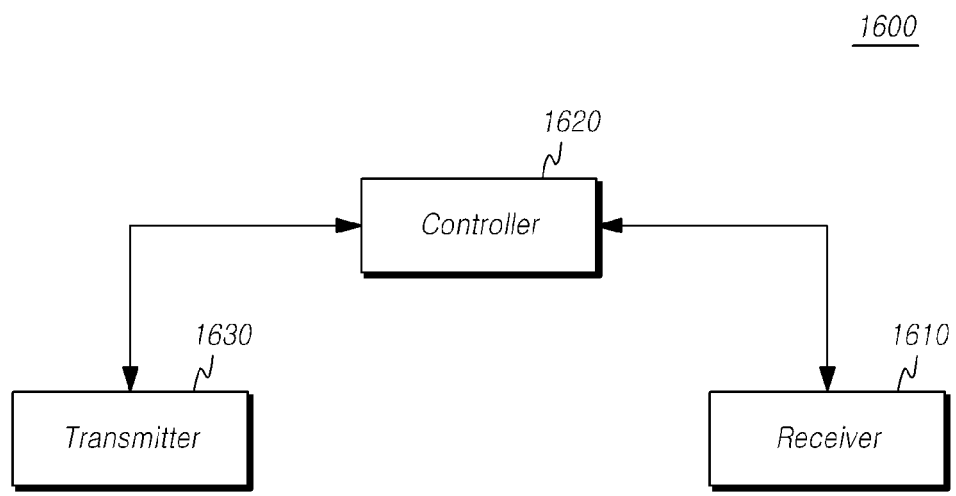
FIG. 16 is a block diagram illustrating a user equipment according to another embodiment of the present disclosure.

FIG. 16 is a block diagram illustrating a user equipment according to an embodiment of the present disclosure.

Referring to FIG. 16, a UE 1600 according to an embodiment includes a receiver 1610, a controller 1620, and a transmitter 1630.

The receiver 1610 may be configured to receive DL control information, data, and messages from a base station through a corresponding channel.

The controller 1620 may include at least one processor and is configured to control the operation of the UE 1600 for performing a multi-beam-based scheduling request in a next-generation wireless communications, according to embodiments of the present disclosure.

The transmitter 1630 may be configured to transmit UL control information, data, and messages to a base station through a corresponding channel.

Referring to FIG. 16, the UE 1600 for performing the scheduling request in wireless communications includes a receiver, a controller, and a transmitter, The receiver may be configured to receive, from a base station, scheduling request configuration information for configuring the scheduling request using multiple scheduling request resources at step S1610. The controller may be configured to allocate the multiple scheduling request resources based on the scheduling request configuration information, and the transmitter may be configured to transmit multiple scheduling requests to the base station using the multiple scheduling request resources.

As described above, the multiple scheduling request resources may be consecutive time resources or resources based on a unit of a pre-configured time, in time domain. The transmitter 1630 may be configured to transmit the multiple scheduling requests to the base station consecutively or based on a unit of a pre-configured time, in the time domain.

As described above, the pre-configured time unit may be one of a radio frame, a slot, a mini-slot, a sub-slot, a subframe, or a symbol, or may be a combination of two or more thereof.

As described above, the multiple scheduling request resources may be frequency resources identical to or different from one another over an identical time resource. The transmitter 1630 may be configured to transmit the multiple scheduling requests to the base station over frequencies identical to or different from one another in an identical time.

Meanwhile, the transmitter 1630 may be configured to multiplex the multiple scheduling requests in an identical time and then transmit the multiplexed multiple scheduling requests to the base station. For example, the transmitter 1630 may be configured to transmit the multiple scheduling requests to the base station over independent frequencies by frequency multiplexing modulation in an identical time.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

The invention claimed is:

1. A base station in wireless communications, the base station comprising:
    a transmitter;
    a receiver; and
    a controller which controls the transmitter and the receiver to:
    transmit, to one wireless device, multi-beam based scheduling request configuration information comprising first scheduling request configuration index information for a first physical uplink control channel (PUCCH) resource and second scheduling request configuration index information for a second physical uplink control channel (PUCCH) resource, wherein each of the first scheduling request configuration index information and the second scheduling request configuration index information is associated with a corresponding PUCCH resource index information; and
    receive, from the one wireless device, a first scheduling request using the first PUCCH resource and a second scheduling request using the second PUCCH resource, in one or more symbols in one slot through a new radio (NR) carrier having a subcarrier spacing of 2n*15 kHz, where n is 0 or a natural number greater than 0, wherein the first scheduling request is not same as the second scheduling request, and wherein the first PUCCH resource is not same as the second PUCCH resource,
    wherein the first and second PUCCH resources are configured based on the multi-beam, wherein the first and second PUCCH resources are mapped to the multi-beam on one-to-one basis, and
    wherein the scheduling requests are transmitted in a specific uplink radio frame, and retransmission is performed with the time duration of a subframe Np, and a transmission position in the subframe is arranged in the first half or the second half of the subframe.

2. The method according to claim 1, wherein:
the multiple scheduling request resources are consecutive time resources or resources based on a unit of a pre-configured time.

3. The method according to claim 2, wherein the pre-configured time unit is one of a radio frame, a slot, a mini-slot, a sub-slot, a subframe, or a symbol, or is a combination of two or more thereof.

4. The base station according to claim 1, wherein the multiple scheduling request resources relate to spatial sectors.

5. The base station according to claim 1, wherein the first scheduling request and the second scheduling request are transmitted simultaneously.

6. An operation method of a wireless device, the method comprising: receiving, from a base station, multi-beam scheduling request configuration information comprising first scheduling request configuration index information for a first physical uplink control channel (PUCCH) resource, and second scheduling request configuration index information for a second physical uplink control channel (PUCCH) resource, wherein each of the first scheduling request configuration index information and the second scheduling request configuration index information is associated with a corresponding PUCCH resource index information; and
transmitting, to the base station, a first scheduling request using the first PUCCH resource and a second scheduling request using the second PUCCH resource, in one or more symbols in one slot through a new radio (NR) carrier having a subcarrier spacing of 2n*15 kHz, where n is 0 or a natural number greater than 0, wherein the first scheduling request is not same as the second scheduling request, and wherein the first PUCCH resource is not same as the second PUCCH resource,
wherein the first and second PUCCH resources are configured based on the multi-beam, wherein the first and second PUCCH resources are mapped to the multi-beam on one-to-one basis, and
wherein the scheduling requests are transmitted in a specific uplink radio frame, and retransmission is performed with the time duration of a subframe Np, and a transmission position in the subframe is arranged in the first half or the second half of the subframe.

7. The method according to claim 6, wherein: the multiple scheduling request resources are consecutive time resources based on a unit of a pre-configured time.

8. The method according to claim 7, wherein the pre-configured time unit is
one of a radio frame, a slot, a mini-slot, a sub-slot, a subframe, or a symbol, or is a combination of two or more thereof.

9. The method according to claim 6, wherein the multiple scheduling request resources relate to spatial sectors.

10. The method according to claim 6, wherein the first scheduling request and the second scheduling request are transmitted simultaneously.

11. A user equipment, the user equipment comprising:
a transmitter;
a receiver; and
a controller which controls the transmitter and the receiver to:
receive, from a base station, multi-beam based scheduling request configuration information comprising first scheduling request configuration index information for a first physical uplink control channel (PUCCH) resource and second scheduling request configuration index information for a second physical uplink control channel (PUCCH) resource, wherein each of the first scheduling request configuration index information and the second scheduling request configuration index information is associated with a corresponding PUCCH resource index information; and
transmit, to the base station, a first scheduling request using the first PUCCH resource and a second scheduling request using the second PUCCH resource, in one or more symbols in one slot through a new radio (NR) carrier having a subcarrier spacing of 2n*15 kHz, where n is 0 or a natural number greater than 0, wherein the first scheduling request is not same as the second scheduling request, and wherein the first PUCCH resource is not same as the second PUCCH resource,
wherein the first and second PUCCH resources are configured based on the multi-beam,
wherein the first and second PUCCH resources are mapped to the multi-beam on one-to-one basis, and
wherein the scheduling requests are transmitted in a specific uplink radio frame, and
retransmission is performed with the time duration of a subframe Np, and a transmission position in the subframe is arranged in the first half or the second half of the subframe.

12. The user equipment according to claim 11, wherein:
the multiple scheduling request resources are consecutive resources based on a unit of a pre-configured time.

13. The user equipment according to claim 12, wherein the pre-configured time unit is one of a radio frame, a slot, a mini-slot, a sub-slot, a subframe, or a symbol, or is a c combination of two or more thereof.

14. The user equipment according to claim 11, wherein the multiple scheduling request resources relate to spatial sectors.

15. The user equipment according to claim 11, wherein the first scheduling request and the second scheduling request are transmitted simultaneously.

16. An operation method of a base station, the method comprising:
transmitting, to a user equipment, multi-beam based scheduling request configuration information comprising first scheduling request configuration index information for a first physical uplink control channel (PUCCH) resource, and second scheduling request configuration index information for a second physical uplink control channel (PUCCH) resource, wherein each of the first scheduling request configuration index information and the second scheduling request configuration index information is associated with a corresponding PUCCH resource index information; and
receiving, from the user equipment, a first scheduling request using the first PUCCH resource and a second scheduling request using the second PUCCH resource, in one or more symbols in one slot through a new radio (NR) carrier having a subcarrier spacing of 2n*15 kHz, where n is 0 or a natural number greater than 0, wherein the first scheduling request is not same as the second scheduling request, and wherein the first PUCCH resource is not same as the second PUCCH resource,
wherein the first and second PUCCH resources are configured based on the multi-beam,
wherein the first and second PUCCH resources are mapped to the multi-beam on one-to-one basis, and
wherein the scheduling requests are transmitted in a specific uplink radio frame, and retransmission is performed with the time duration of a subframe Np, and a transmission position in the subframe is arranged in the first half or the second half of the subframe.

17. The method according to claim 16, wherein:
the multiple scheduling request resources are consecutive resources based on a unit of a pre-configured time.

18. The method according to claim 17, wherein the preconfigured time unit is one of a radio frame, a slot, a mini-slot, a sub-slot, a subframe, or a symbol, or is a combination of two or more thereof.

19. The method according to claim 16, wherein the multiple scheduling request resources relate to spatial sectors.

* * * * *